Nov. 3, 1931.  W. E. LEECH ET AL  1,830,740

FREIGHT HANDLING DEVICE

Filed March 19, 1929  9 Sheets-Sheet 1

INVENTORS
William E. Leech
Woodward T. Leech
Alfred T. Barager
By J. W. Ellis
ATTORNEY

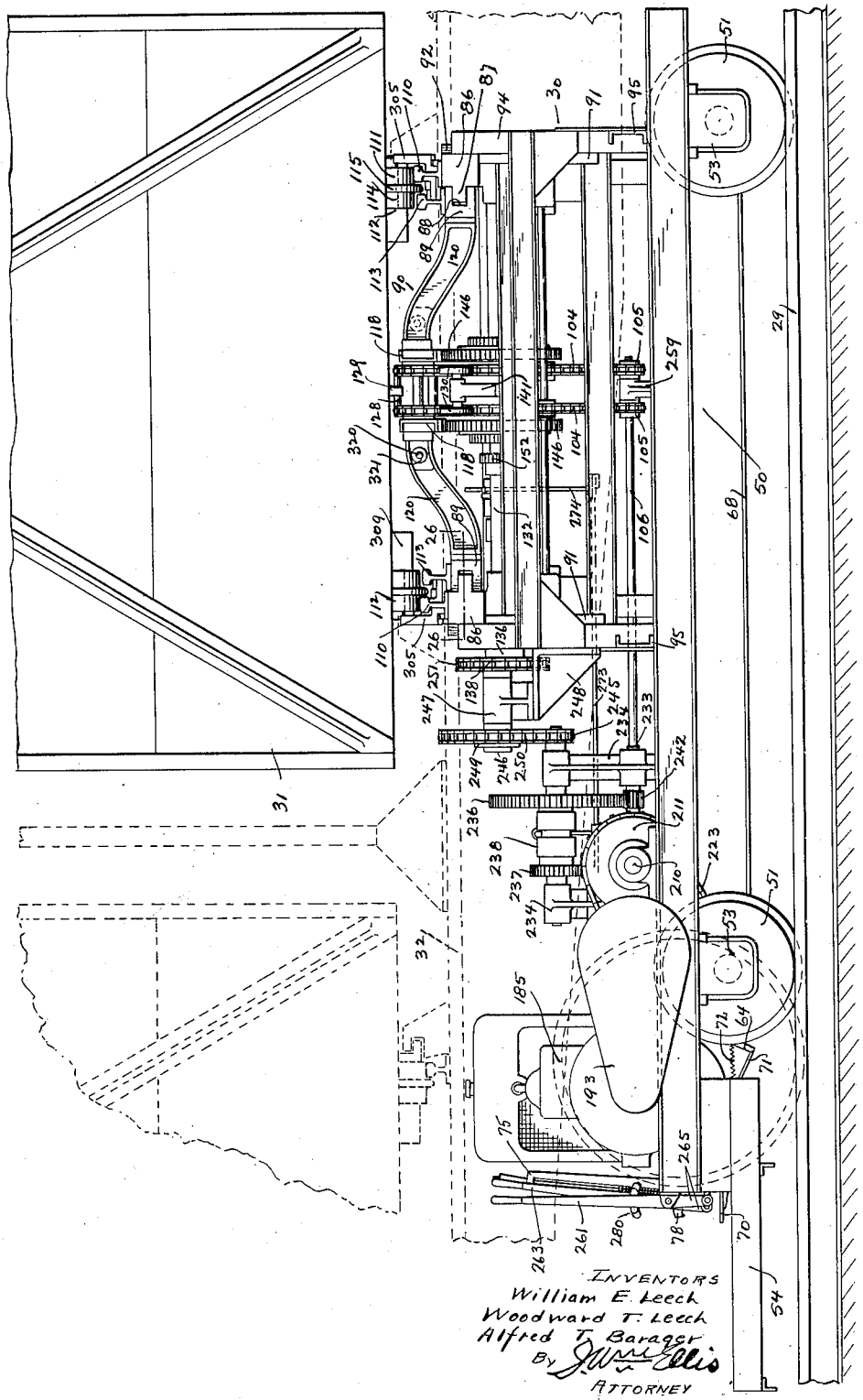

Nov. 3, 1931.  W. E. LEECH ET AL  1,830,740
FREIGHT HANDLING DEVICE
Filed March 19, 1929  9 Sheets-Sheet 4
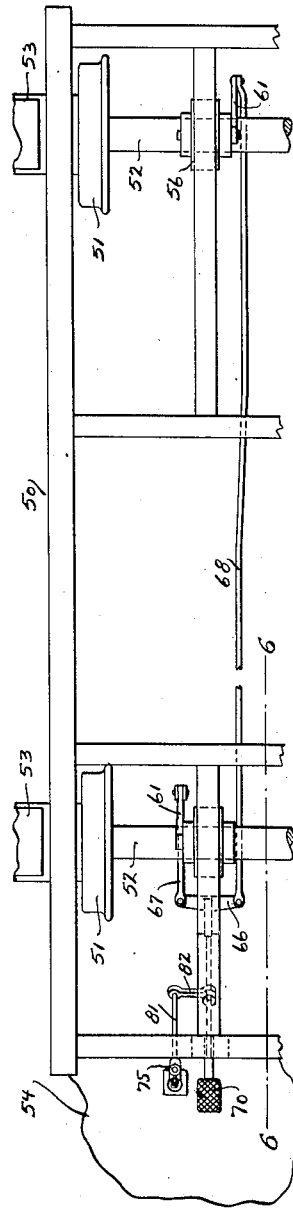
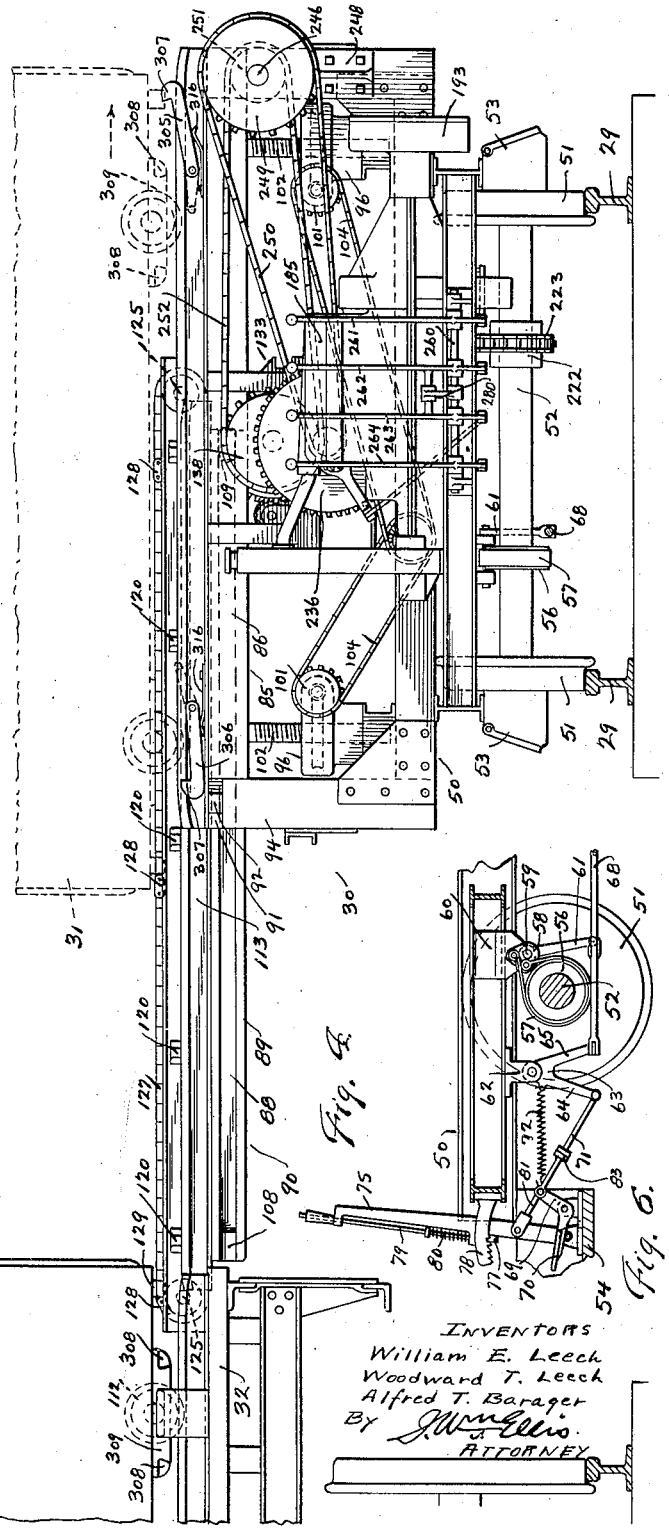
Inventors
William E. Leech
Woodward T. Leech
Alfred T. Barager
By J. W. Ellis
Attorney

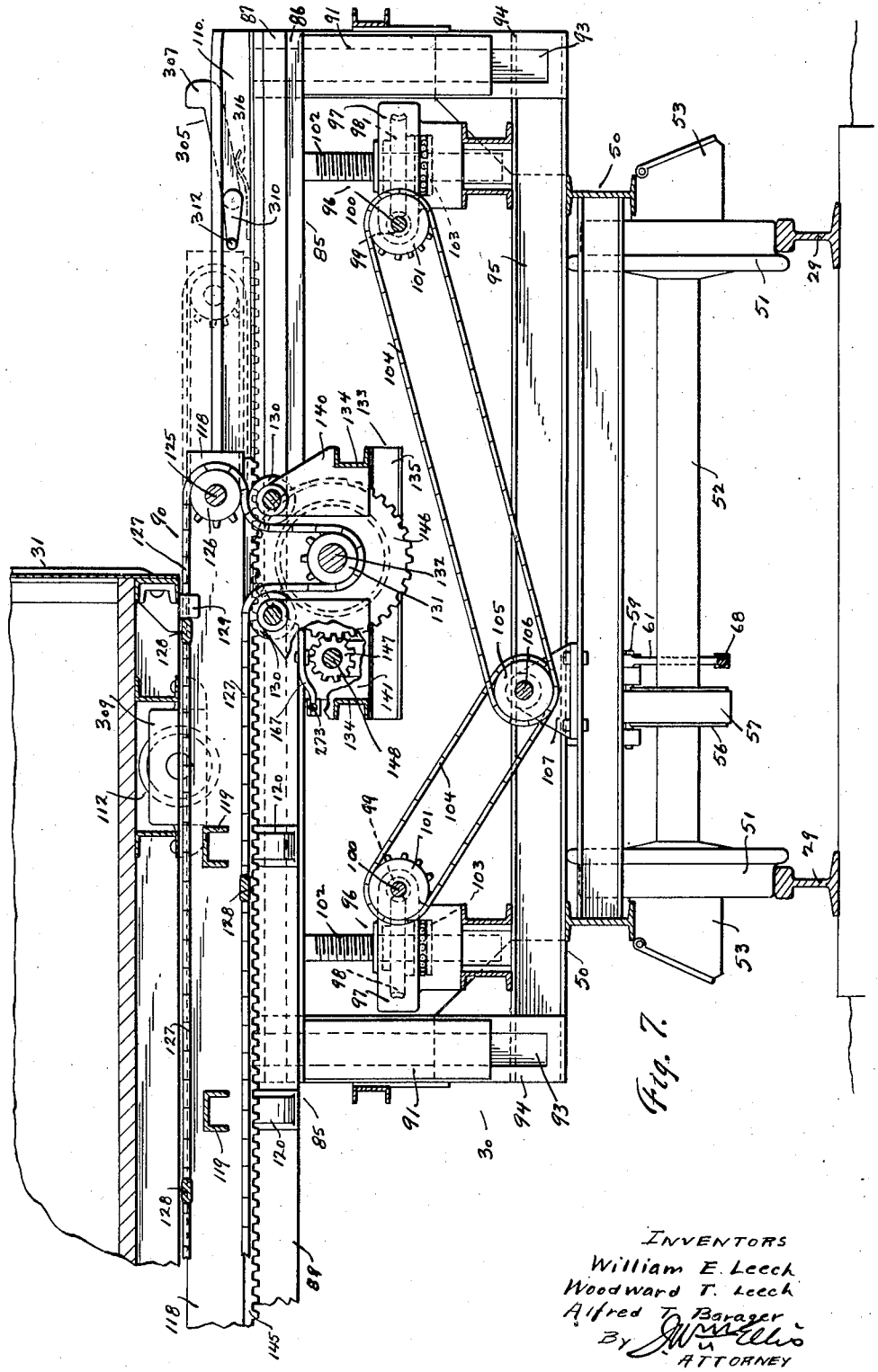

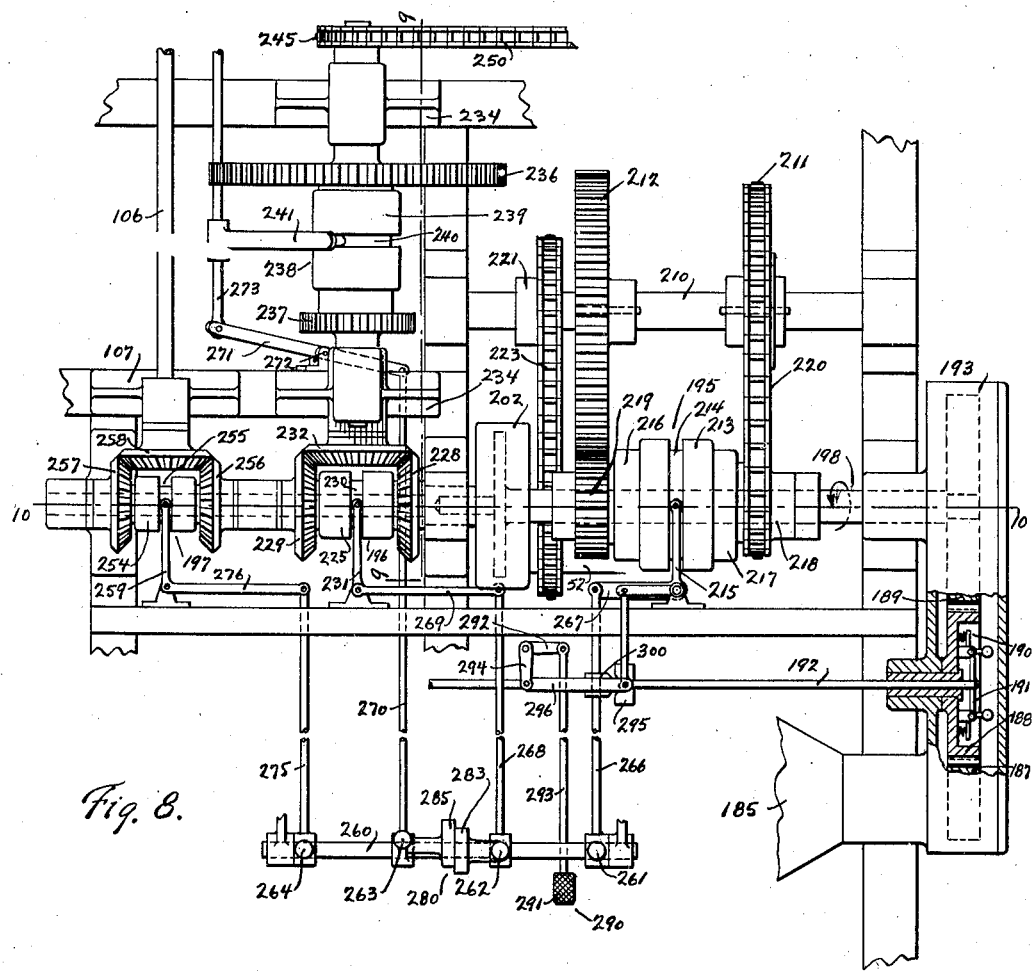
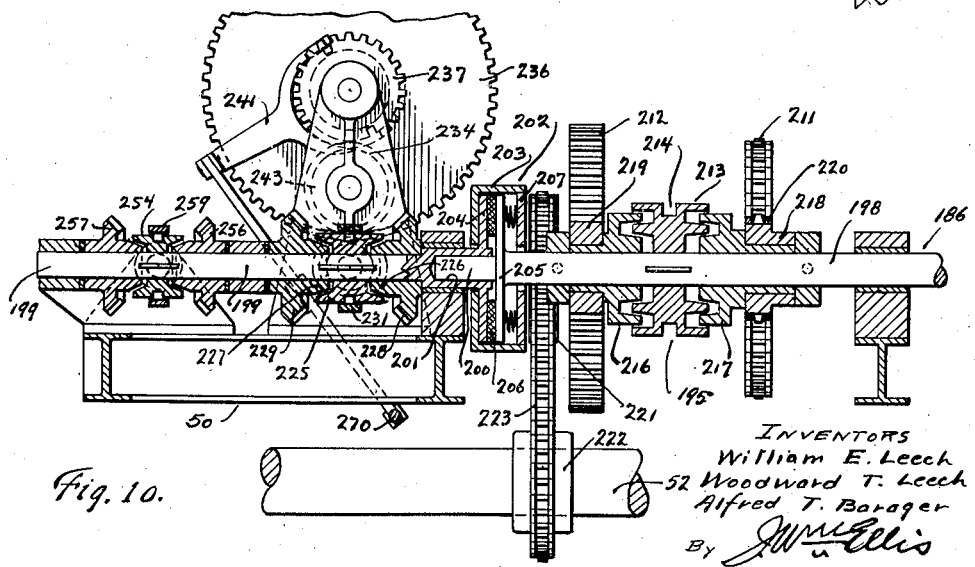

Nov. 3, 1931.   W. E. LEECH ET AL   1,830,740
FREIGHT HANDLING DEVICE
Filed March 19, 1929   9 Sheets-Sheet 7

INVENTORS
William E. Leech
Woodward T. Leech
Alfred T. Barager
By
ATTORNEY

Nov. 3, 1931.    W. E. LEECH ET AL    1,830,740
FREIGHT HANDLING DEVICE
Filed March 19, 1929    9 Sheets-Sheet 8

INVENTORS
William E. Leech
Woodward T. Leech
Alfred T. Barager
By J. W. Leech
ATTORNEY

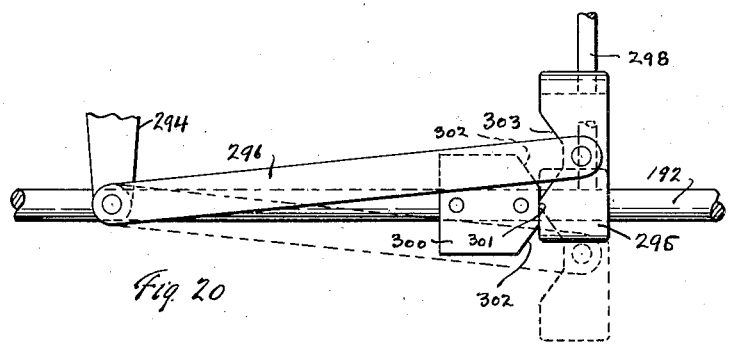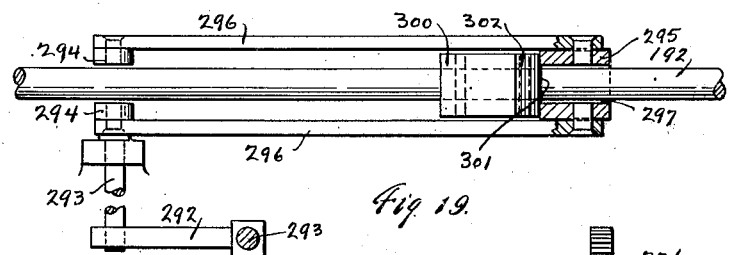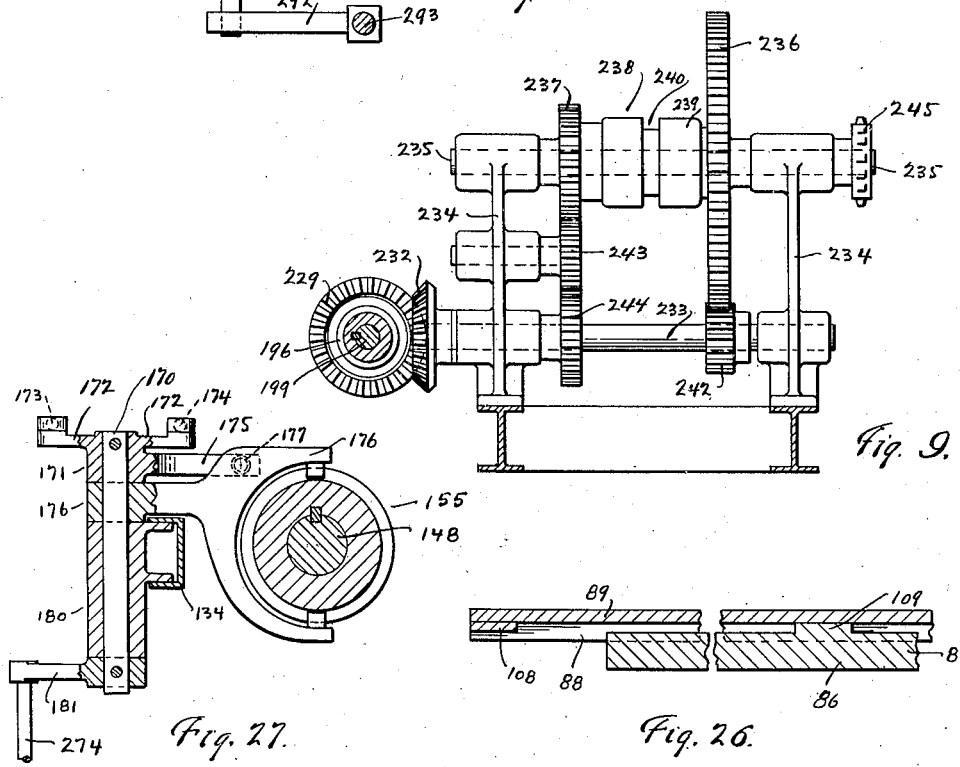

Patented Nov. 3, 1931

1,830,740

UNITED STATES PATENT OFFICE

WILLIAM E. LEECH, OF COLUMBUS, MISSISSIPPI, AND WOODWARD T. LEECH AND ALFRED T. BARAGER, OF BUFFALO, NEW YORK, ASSIGNORS TO LEECH CARRIER CORPORATION, OF BUFFALO, NEW YORK, A CORPORATION OF NEW YORK

FREIGHT HANDLING DEVICE

Application filed March 19, 1929. Serial No. 348,311.

Our invention relates in general to freight handling devices, and in particular to a device by which closed containers may be conveniently carried or conveyed from the warehouse to a freight car, or vice versa, or from one freight car to another.

The principal objects of our invention have been to provide a device whereby freight containers, which may be previously loaded and locked or sealed, may be conveyed from the freight car to the warehouse, or vice versa, in an easy, quick, and safe manner.

Another object has been to provide a conveyor having extensible means over which a freight handling or car section may be drawn onto the conveyor.

Another object has been to provide a device having means for adjusting the level of the conveyor to suit varying heights of car and warehouse platforms.

Another object has been to provide a conveyor having interlocking means, whereby the carriage of the device will be positively held against operation while a car section is being drawn onto the conveyor.

Moreover, our device is provided with means for automatically governing the speed of all movements except the travel of the conveyor.

The above objects and advantages have been accomplished by the device shown in the accompanying drawings, of which:

Fig. 3 is a side elevation of the complete device.

Fig. 4 is an enlarged front elevation of our complete device.

Fig. 5 is a fragmentary, plan view of the chassis of the conveyor frame.

Fig. 6 is a fragmentary, side, sectional elevation thereof, and is taken on line 6—6 of Fig. 5.

Fig. 7 is an enlarged sectional elevation of our device taken on line 7—7 of Fig. 2.

Fig. 8 is an enlarged fragmentary, plan view of a portion of the control mechanism of our device.

Fig. 9 is a fragmentary, sectional elevation of a portion of the control mechanism of our device, taken on line 9—9 of Fig. 8.

Fig. 10 is a fragmentary, sectional elevation through the clutch shaft, and taken on line 10—10 of Fig. 8.

Fig. 19 is a side elevation of the same.

Fig. 20 is a fragmentary view of the accelerator interlocking means showing the parts in various positions.

Fig. 26 is an enlarged, fragmentary, sectional view, showing the carriage stops, and taken on line 26—26 of Fig. 3.

Fig. 27 is an enlarged, fragmentary, sectional view of the carriage clutch operating means, taken on line 27—27 of Fig. 11.

Our device comprises in general a main frame which is propelled back and forth over rails which are arranged parallel to the railroad track, upon which the freight cars are located, and preferably at right angles to a line of siding tracks arranged on a warehouse platform; a main platform which can be raised and lowered so as to bring the device at an elevation which will correspond to the elevation of the freight car platform or the warehouse platform; and a carriage reciprocally mounted so as to be moved laterally to the main frame and provided with means for positively locking it in its adjusted position and having conveyor chains which serve to draw the car section across the carriage and onto rails carried by the main platform.

It will be understood that the car section referred to is a container which is preferably sealed, and which may be in the form of an enclosed metal container having doors; a tank for containing liquids; or in the nature of a crate, platform, or other desired form. These car sections are provided with wheels having double treads and are mounted upon rails carried upon the top of a flat car which rails are arranged at right angles to the line of travel of the car.

Figure 1:
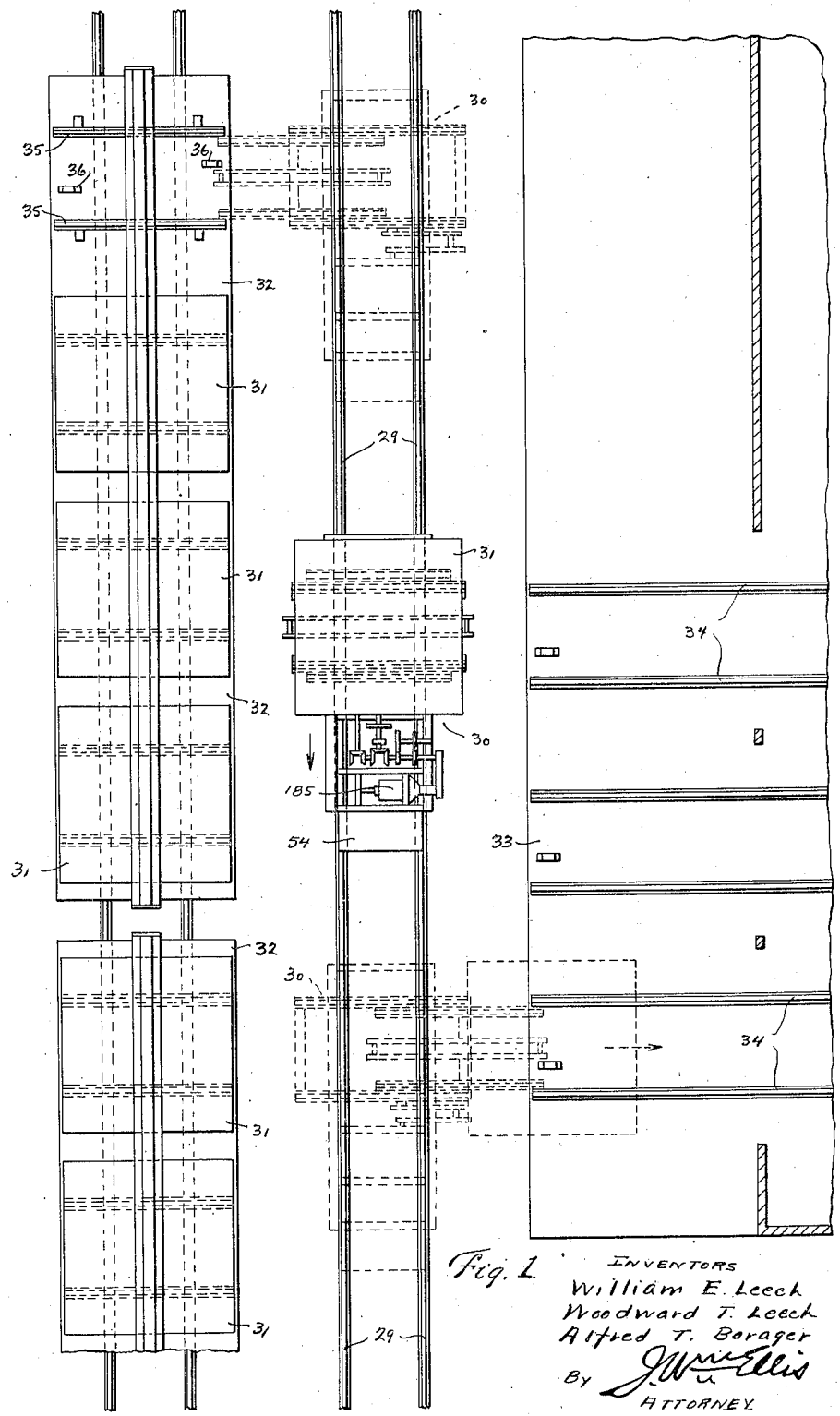
Fig. 1 is a plan view of our device showing its application to a freight car and a warehouse.
Figure 21:
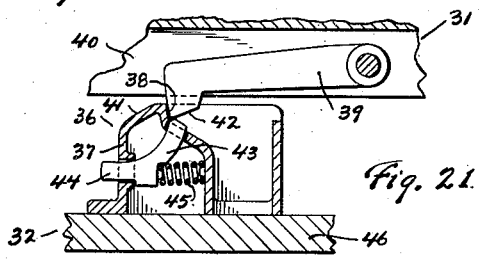
Fig. 21 is a fragmentary, sectional view showing the locking means of the freight car for locking a car section in place.

In Fig. 1, 30 represents our conveyor mounted upon rails 29 which are arranged preferably parallel with the track upon which the freight car travels, and is shown as transporting one of the car sections 31. In this figure, platform cars 32 are shown, upon which are carried the car sections 31. The car section which is being transported by our device has been taken from the upper end of the upper flat car 32, and the device is shown in dotted lines in the position which it occupied when the section was removed from the flat car. The car section carried by our device is being transported in the direction indicated by the arrow, and it is being conducted to the lower end of the warehouse platform 33 where it is to be run upon the rails 34 carried by this platform, the lower dotted line position of this figure showing the position occupied by our device when the container is being run onto the warehouse platform. The car section 31 has been removed from the rails 35 of the flat car at the upper end thereof. Suitable stops 36 are carried between each pair of rails 35 on the flat car and serves to lock the car section in position upon the rails. One of the stops is shown in Fig. 21 and comprises a housing 37 secured to the platform 46 of the flat car 32. This casing is formed with an inwardly projecting abutment 38 with which a latch 39 engages. The latch 39 is carried by the superstructure 40 of the car section 31 and falls into position by gravity when the car section has reached its predetermined position upon the platform of the flatcar. The forward part of the casing 37 of the stop is provided with an inclined surface 41 which engages an inclined surface 42 of the latch and carries it up over the casing to the surface 38 at which time it will drop down and engage with such surface. The stop is provided with means for releasing the engagement of the latch with the surface 38 of the casing when the car section is to be removed from the freight car. This means preferably comprises an arc-shaped release lug 43 movable within the casing and having a forwardly extending end 44 which is engaged by means carried by the carriage, to be hereinafter described. The upper end of the lug is slidable within the casing and is engageable with the forward end of the latch 39, and as the end 44 is pressed inwardly, the upper end of the lug forces the latch out of contact with the surface 38, thus releasing the car section. The lug 43 is kept in its normal inactive position by means of a helical spring 45 arranged between it and the wall of the casing.

The main frame 50 which supports all the parts of the device is made up of suitable channel iron and is mounted upon suitable car wheels 51, carried by axles 52, one arranged at the front and one at the rear of the frame (Figs. 4 and 5). These axles are suitably journaled in boxes 53, carried by the frame. Supported at the front of the main frame is an operator's platform 54 from which all the controls of the device are operated.

The conveyor is provided with suitable brakes which comprise a brake drum 56, one rigidly carried by each of the axles 52 (Figs. 5 and 6). A brake band 57 is provided for each of the drums and its ends are looped and suitably supported by a block 58 which is carried by the rock shaft 59 of the brake. This rock shaft is suitably mounted in bearing brackets 60 and has keyed to one of its ends an operating arm 61. Mounted in front of the forward axle 52 is a bracket 62 which carries a two arm lever 63 having a forward arm 64 and a rearward arm 65. The rearward arm has pivotally secured to it a brake equalizer 66, one end of which is connected by means of a rod 67 to the operating arm 61 of the forward brake, and the other end of the equalizer is connected by means of a rod 68 to the operating arm 61 of the rear brake. The forward arm 64 of the two arm lever 63 is connected to the arm 69 of the foot brake pedal 70 by means of a link 71. A helical spring 72 connected at one end to the two arm lever 63 near its pivotal point and at its other to the arm 69 of the foot pedal serves to keep the brakes normally in their expanded positions. A hand or an emergency brake arm 75 is also provided for operating and permanently setting the brakes. This arm is pivotally attached to the platform by means of brackets 76, and is provided with the usual ratchet dog 77 which engages with a ratchet segment 78 carried by the main frame. The dog 77 is, of course, operated by means of the rod 79 and spring 80, as is customary in brakes of this nature. At some point above the pivotal point of the brake arm is attached an operating link 81. This link rigidly carries at its lower end an arm 82, the outer end of which is slidably mounted upon the link 71 and is engageable with a collar 83 fixed to the link 71. By this arrangement, it will be clear that the foot brake pedal 70 may be operated independently of the hand or emergency brake arm, but that when the emergency brake arm is operated, it will, through the medium of the arm 82 and fixed collar 83 be positively connected to the braking mechanism and serve to operate the same (Figs. 5 and 6).

The main platform 85 is best seen in Figs. 3, 4, and 7. This platform comprises two tongued guiding rails 86, running laterally across the main frame, and arranged one at each side of the platform. Each rail is provided with a tongue 87 for engagement with the grooves 88 formed in the grooved rail 89 of the carriage 90 of our device, to be hereinafter described. Arranged at each end of each tongued guide rail 86 is a tongued guide post 91, having a tongue 92 (See Fig. 2) which is engageable with a groove 93 formed in vertical posts 94. These vertical posts are carried by a suitable superstructure 95 of the main frame 50, by which arrangement of parts, the main platform may be raised and lowered. Carried by the structure 95 and arranged at each corner thereof is an elevating jack 96. These jacks may be of any suitable form or design, and each of them preferably comprises a housing 97 having a worm gear 98 mounted therein with which a worm 99 engages. The worm wheel 98 carries an elevating screw 102 which has its upper end in contact with one end of the tongued guide rails 86. Each jack is preferably provided with a ball step bearing 103 so as to reduce the friction. Four jacks are provided and the worms of each pair at each end of the superstructure 95 are connected to a shaft 100. The two shafts 100 extend across and beneath the main platform, and each of them carries a sprocket 101. The sprockets 101 are connected by means of sprocket chains 104 to suitable sprockets 105 mounted on an elevating shaft 106. The jacks are thus connected together so as to be operated in unison. The elevating shaft 106 is suitably carried by the main frame in bearing brackets 107 and is driven by means to be hereinafter described. Mounted on the top of each of the tongued grooved rails 86 are car rails 110, for engagement with the treads 111 of the wheels 112 of the car sections. These treads also engage with the rails 35 of the freight car platform and rails 34 of the warehouse platform. Since these rails are slightly higher than the rails 113 of the carriage (to be hereinafter described) the extreme ends are slightly inclined so as to easily meet the level of the rails 113. The wheels 112 are also provided with oppositely arranged treads 114, separated from the tread 111 by means of a centrally arranged flange 115. The treads 114 engage with the rails 113 of the carriage.

Figure 2:
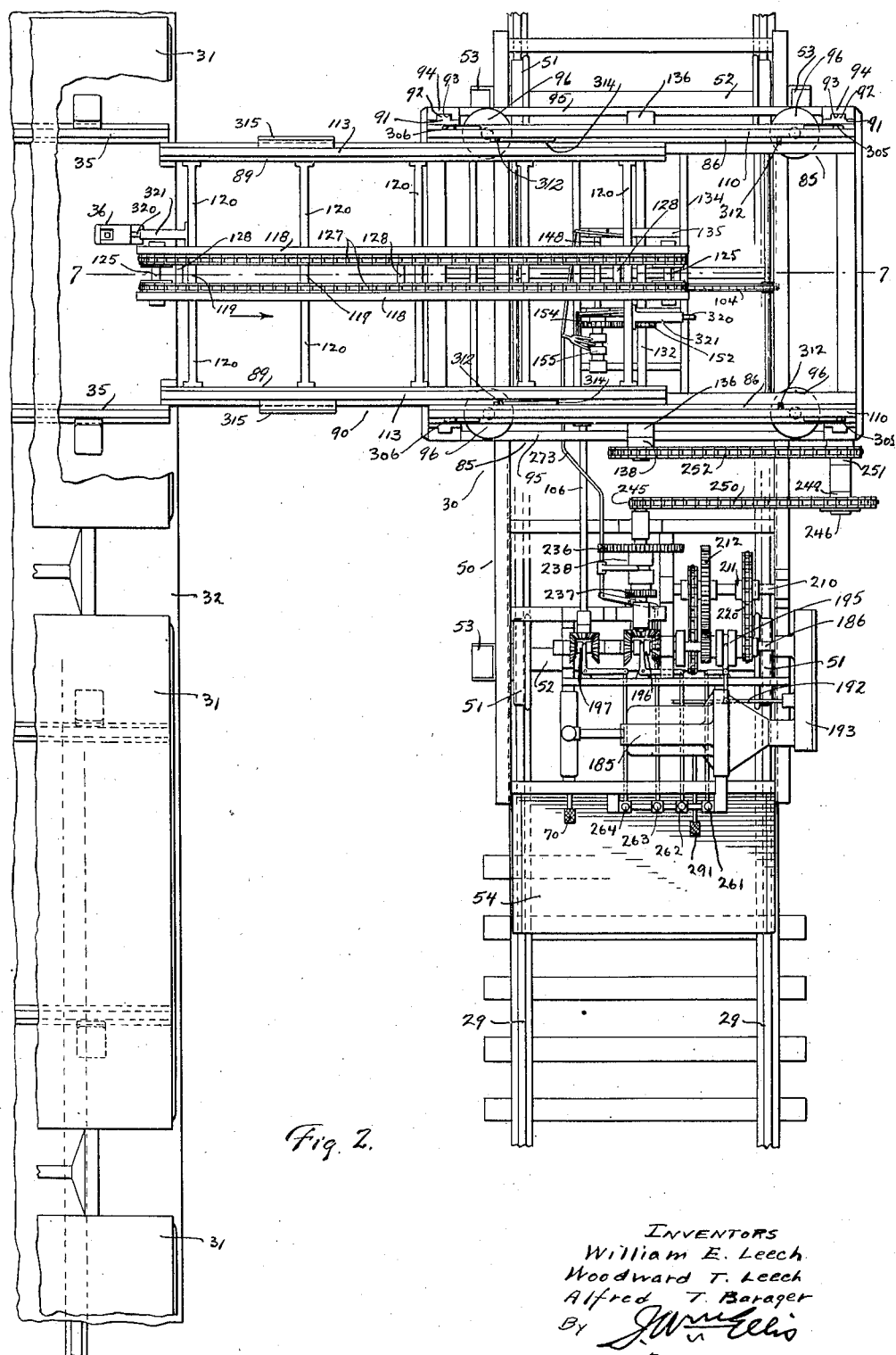
Fig. 2 is an enlarged plan view of our complete device.

The carriage 90 comprises grooved rails 89, one arranged at each side of the carriage and in sliding engagement with the tongue 87 of the tongued guide rail 86. The grooved guide rails 89 are provided at each end with a stop 108 which engages with a fixed stop 109 carried by the tongue 87 of the tongued guide rail 86, whereby the carriage will be prevented from being moved beyond its limits (Figs. 4 and 26). Two longitudinally extending channel irons 118 are arranged in interspaced and parallel relation at the center of the carriage, and preferably at some distance above the plane of the grooved rails 89, (Figs. 2, 3 and 7). These channels are held in interspaced relation with each other by means of the separators 119, and are held in place by means of curved braces 120 which connect each channel with the adjacent grooved rail 89. Arranged at each end of the interspaced channels 118 is rotatably mounted a sprocket shaft 125 (Fig. 7), upon each of which is mounted two interspaced sprocket wheels 126. Carried by these sprocket wheels are two interspaced carriage chains 127. One of these chains is, of course, arranged near one of the channels 118, while the other one is arranged near the other channel. They are connected together by means of connector blocks 128 arranged at intervals in the length of the chains and which are engageable with a lug 129 carried on the underside of the car section 31, which provides the means for connecting the car section with the carriage chains for drawing the car section onto the rails 113 of the carriage and onto the rails 110 of the main platform.

Figure 11:
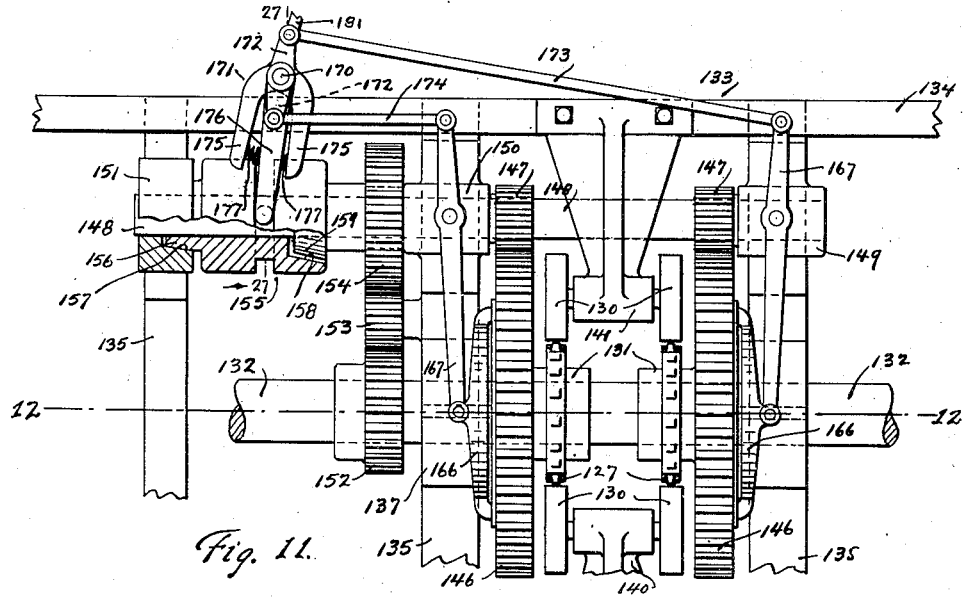
Fig. 11 is an enlarged fragmentary, plan view of the carriage control mechanism.
Figure 12:
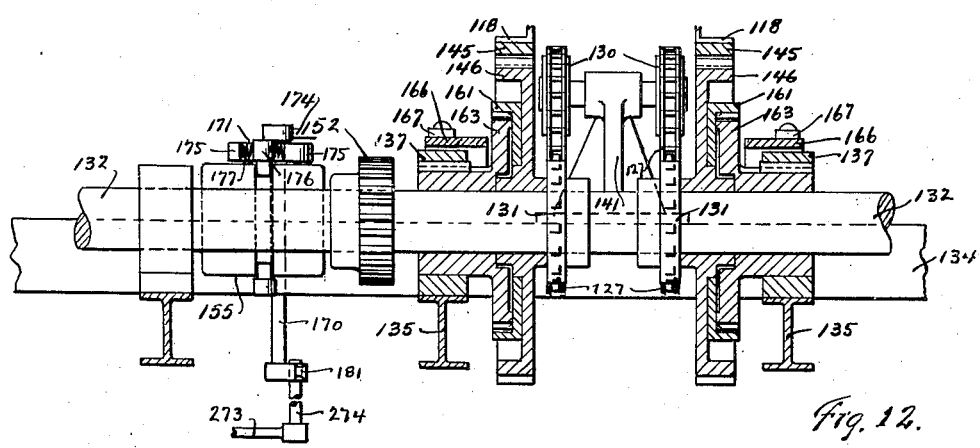
Fig. 12 is a sectional elevation of the same and is taken on line 12—12 of Fig. 11.

Each of the carriage chains 127 is looped downwardly near the center of the main platform, and pass over interspaced guide rollers 130 and around drive sprockets 131. The drive sprockets 131 are rigidly mounted upon a carriage shaft 132 (Figs. 11 and 12). This shaft is suitably supported at its ends in journals 136 (Fig. 2) and near its central portion in journals 137 which are carried by a subplatform 133. The forward end of this shaft extends beyond the main platform on which is secured a sprocket wheel 138 (Figs. 2 and 3) by which the carriage shaft receives its power as hereinafter described. The subplatform 133 comprises longitudinally arranged channel irons sections 134, suitably suspended from the main platform 85 and a plurality of lateral members 135. One pair of guide rollers 130 is rotatably supported by a bracket 140 and the other pair of rollers is supported by means of a bracket 141. These brackets are preferably supported by and secured to the longitudinal channel iron sections 134.

Since the carriage 90 is mounted for reciprocation within the main platform, suitable means must be provided for driving this platform. Means also must be provided for locking the carriage while a car section is being drawn thereupon. Secured to the underside of each of the channels 118 is a gear rack 145, each of which is engageable with a carriage drive gear 146. These gears are loosely mounted upon the carriage shaft 132 and preferably arranged adjacent to the chain drive sprockets 131. Each of these gears meshes with a carriage pinion 147, rigidly mounted upon a carriage jack shaft 148. This jack shaft is suitably mounted in bearings 149, 150 and 151, carried by the lateral members 135 of the subplatform. This jack shaft is driven through the medium of a gear 152 rigidly mounted upon the carriage shaft 132 and meshing with an idler gear 153. This idler gear is suitably mounted upon the lateral member of the subplatform and meshes with a clutch gear 154. This clutch gear is loosely mounted upon the jack shaft 148, and is connected with it by means of the carriage clutch 155. This clutch is slidably mounted upon the jack shaft and keyed to it so that it rotates with the shaft but may be moved axially thereon. The outer end of the clutch has a tapered member 156 which fits into a tapered recess 157 in the bearing 151, and at its opposite end it is provided with a tapered recess 158, which is engaged by the tapered member 159 carried by the clutch gear 154. Obviously, when this carriage clutch 155 is moved to the right as seen in Fig. 11, the clutch gear 154 will be engaged with the jack shaft and cause the carriage drive gears 146 to be rotated. When the carriage clutch is operated to the left as viewed in this figure, the jack shaft will be stopped and held against rotation by the engagement of the clutch with the bearing 151.

Figure 13:
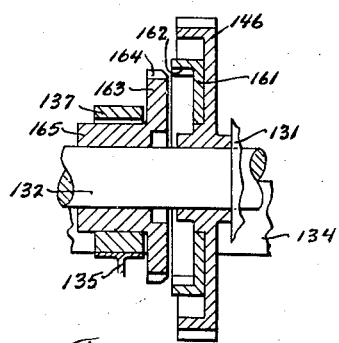
Fig. 13 is a fragmentary, sectional view of one of the carriage locking means shown in Fig. 12 but shown in its unlocked position.
Figure 14:
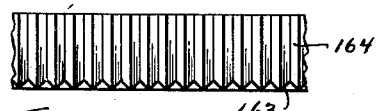
Fig. 14 shows an enlarged view of the serrated periphery of the slidable member of the carriage locking means.
Figure 15:
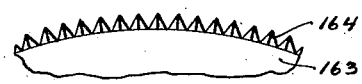
Fig. 15 is a fragmentary, end elevation of the same.

In addition to the holding of the operating jack shaft 148 with the bearing 151, each of the carriage drive gears are positively locked after the jack shaft is stopped and held. Each of these gears has carriage locking means which comprises a drum 161 rigidly mounted upon the gear and having a serrated inner periphery 162 of any suitable form. An annular locking disc 163 having a serrated periphery 164 is engageable with the serrated inner periphery of the drum 161. The disc 163 is provided with a hub 165 which is slidably mounted upon the carriage shaft 132 and keyed to the bearing 137 (Figs. 12 and 13). The discs 163, therefore, have sliding engagement with the bearings 137, but do not rotate therewith because of the fact they are keyed to such bearings. A yoke 166 is carried by each of the discs 163.

A lever 167 is provided for each of the yokes 166 and the right hand lever (as viewed in Fig. 11) is pivoted to the bearing 149 while the left hand lever is pivoted to the bearing 150. Arranged at one side of the subplatform, and immediately back of the carriage clutch 155, is a carriage clutch shifter shaft 170 to the upper end of which is mounted shifter fork 171. This shifter fork has two oppositely extending arms 172, the upper of these arms as viewed in Fig. 11 being connected to the free end of the right hand lever 167 by means of a link 173, and the lower of these arms being connected to the left hand lever 167 by means of a link 174. By means of these connections, when the shaft 170 is oscillated in a clockwise direction, both carriage locking means will be thrown into engagement, as shown in Fig. 11, and when the shaft is oscillated in the opposite direction, both of such means will be disengaged, as shown in Fig. 13. The shifter fork 171 has two interspaced shifter arms 175 which extend over the carriage clutch 155 and which engage with the clutch shifter arm 176 through the medium of helical springs 177, arranged one between each of the arms 175 and the shifter yoke. The shifter yoke is loosely mounted upon the shaft 170 and is operated only by means of the fork and through the medium of its arms and springs. When the carriage clutch shifter shaft is oscillated to engage the carriage locking means, the arm 175 of the fork at the right as viewed in Fig. 11, will yieldably press the shifter yoke 176 toward the left of this figure and thus engage the carriage clutch with the tapered recess 157 formed in the bearing 151. The springs permit the carriage locking means to be operated to the full limit of their movement after the carriage clutch members have come into engagement. When the left hand shifter arm 175 is brought into play by counterclockwise oscillation of the shifter shaft 170, the spring at that side of the fork will engage the shifter yoke 176 and move the carriage clutch to the right where it will cause the clutch gear 157 to be engaged with the conveyor jack shaft 148, after which the fork will continue to move until the discs 163 have been moved out of engagement with the drums 161. The serrations on the surfaces 164 and 162 are preferably chamfered at their entering edges, so that they may always be engaged no matter what their relative positions may be. The shifter shaft 170 is suitably mounted in a bearing 180, and rigidly secured to its lower end is an operating arm 181, which is operated by means of the controls of the device to be hereinafter described.

Carried by the main frame of our device is the motive power, which may be of any suitable kind; such as, an electric motor, steam power, or a gasoline engine, but for purposes of illustration I have shown a gasoline engine 185 which has the axis of its shaft arranged preferably at right angles to the travel of the conveyor. The gasoline engine is connected to a clutch shaft 186 by means of a gear 187 carried by the motor, an idler gear 188, and a clutch shaft gear 189. The idler gear 188 is preferably formed with a recess 190 in which is mounted a governor 191. This governor controls an accelerator rod 192 which passes through the hub of the gear and which is connected in any suitable way with the throttle of the gasoline engine. This connection does not form any part of our invention and for this reason and also for the fact that such a connection is an obvious one, it is not herein shown or further described. A casing 193 is preferably provided for the gears just described for suitably enclosing them. The clutch shaft 186 has mounted upon it a conveyor clutch 195, an operating clutch 196, and a jack clutch 197. The clutch shaft is formed preferably of two parts 198 and 199. The conveyor clutch 195 is mounted upon the portion 198, while the operating clutch 196 and the jack clutch 197 are mounted upon the portion 199 of the clutch shaft. The portion 198 of this shaft is provided with a reduced part 200 which is mounted within a recess 201 in the adjacent end of the portion 199 of the shaft, and these portions of the shaft are connected together by means of a safety clutch 202. This clutch comprises a housing 203 in which is mounted a disc 204 carried by the portion 199 of the shaft and a disc 205 carried by the portion 198 thereof. Suitable frictional surfaces 206 are provided between the discs 204 and 205 and springs 207 carried by the casing serve to force the discs toward the frictional surfaces. By means of this safety clutch, the parts connected by means of the operating clutch 196 and jack clutch 197 are yieldably connected with the motive power, but the conveyor clutch 195 is positively connected therewith.

Arranged in parallel relation with the clutch shaft 186 is a conveyor jack shaft 210 mounted for rotation in suitable bearings and carrying a sprocket wheel 211 and a spur gear 212. As shown in Fig. 10, the conveyor clutch 195 comprises a shifter element 213 which is keyed to the part 198 of the clutch shaft, and is, therefore, prevented from rotating relative therewith but is slidable in either direction. The clutch element is provided with a groove 214 with which the shifter arm 215 engages (Figs. 8 and 10). A clutch element 216 is arranged at one side of the clutch element 213 and a clutch element 217 is arranged at the other side thereof. The coacting parts of the clutch are provided, of course, with suitable clutch engaging faces of any desired formation. Each of the elements 216 and 217 is rotatably mounted upon the clutch shaft and held in place by suitable collars. Mounted upon the hub of the element 217 is sprocket wheel 218, and mounted upon the hub of the element 216 is a gear pinion 219. The sprocket 218 is connected with the sprocket 211 carried by the jack shaft 210 by means of a sprocket chain 220 and the gear pinion 219 carried by the element 216 meshes with the spur gear 212. By these means, the jack shaft can be rotated in either direction by the proper manipulation of the conveyor clutch 195. The jack shaft 210 also carries a drive sprocket 221 which is connected to a sprocket 222 carried by one of the axles 52 of the conveyor by means of a sprocket chain 223, whereby the conveyor may be operated forwardly or backwardly.

The operating clutch 196 which is carried by the portion 199 of the clutch shaft 186 is provided with a slidable member 225 which is suitably keyed to the shaft so as to prevent rotation therewith and which is engageable with clutch members 226 and 227 carried respectively by bevel gears 228 and 229. These bevel gears are arranged at opposite sides of the member 225 of the clutch and are engageable one at a time with such member. The bevel gears are, of course, rotatably mounted upon the shaft and are driven by the clutch shaft only when engaged by the clutch member 225. The clutch member is provided with a groove 230 with which a shifter 231 is engageable. Meshing with the bevel gears 228 and 229 is a bevel gear 232. This bevel gear is carried by the forward end of an operating shaft 233 which is suitably journaled in bearings 234. Also carried by the bearings 234 is an operating jack shaft 235 (Fig. 9). This jack shaft is preferably arranged above the shaft 233 and has loosely mounted upon it a chain gear 236 and a carriage gear 237. These gears are connected to the shaft by means of a selective clutch 238. This clutch like the other clutches herein described comprises a slidable member 239 which is keyed to the operating jack shaft 235 and which is engageable either with a clutch member carried by the chain gear 236 or with a clutch member carried by the carriage gear 237. A groove 240 is provided in the member 239 with which a shifter 241 engages. The chain gear 236 meshes with a gear pinion 242 non-rotatably mounted upon the operating shaft, and the carriage gear 237 is connected to the operating shaft through an idler 243, suitably carried by the bearing 234 and a gear 244 non-rotatably carried by the operating shaft. By means of the operating clutch 196, the operating shaft may be driven in either direction, and by means of the selective clutch 238, either the chain gear 236 may be connected for driving the chains or the carriage gear 237 connected for moving the carriage.

When the carriage is being operated, the carriage chains are also being operated, but the ratio of movement between the carriage and the chains is such that when the carriage is being moved, the upper pass of the carriage chains 127 will remain stationary with respect to the main platform. It is for this reason that the carriage can be moved to either side of the main platform when a car section is being held thereon. The movement of the chains is effective to move the car section only when the carriage drive gears 146 are locked.

To the rear end of the operating jack shaft 235 is attached a sprocket wheel 245 which conducts power to the sprocket 138 of the carriage shaft 132 mounted on the main platform. Since the main platform has vertical movement, some means must be provided for compensating for such movement in conducting power from the operating jack shaft to the carriage shaft. In order to compensate for such movement we provide a short jack shaft 246 carried by a bearing 247 which is supported by a bracket 248, carried at one side of the main frame. The center of the shaft 246 is preferably arranged at a point opposite the operating jack shaft 235 when this shaft is in its neutral or middle position. The shaft 246 carries a sprocket wheel 249 which is connected by means of a chain 250 to the sprocket 245 carried on the end of the operating jack shaft 235. The jack shaft 246 also carries a sprocket 251 which is connected to the sprocket 138 carried by the carriage shaft 132 by means of a chain 252. There is sufficient slack provided in the chain 252 so that it will have the proper tension when the main platform is moved to its extreme upper and lower positions.

The jack clutch 197 which is carried upon the part 199 of the clutch shaft 186 is provided with a slidable member 254, having a central groove 255, and engageable, like the operating clutch 196, with either a clutch member carried by a bevel gear 256 mounted at one side thereof or with a bevel gear 257 mounted at the opposite side thereof. The bevel gears 256 and 257 are rotatably mounted upon the portion 199 of the clutch shaft, and are rotated with the shaft by means of the clutch member 255. A shifter 259 is provided for this clutch. A bevel gear 258 meshes with the gears 256 and 257 and it is carried by the forward end of the elevating shaft 106. By means of the jack clutch 197 the elevating shaft may be operated in either direction to raise or lower the main platform. The elevating shaft extends rearwardly of the main frame, and has its rear end rotatably mounted within a bearing block 259 (Fig. 3), secured to the main frame and mounted preferably beneath the center of the main platform.

Carried by the forward end of the main frame and arranged over the operator's platform is a rigidly mounted lever shaft 260 (Fig. 8) upon which are mounted a conveyor clutch lever 261, an operating clutch lever 262, a selective clutch lever 263, and a jack clutch lever 264. Each of these levers is pivotally carried by the lever shaft, and each has a downwardly extending end 265 (Fig. 3). To the downwardly extending end 265 of the conveyor clutch lever 261 is a link 266, which connects this lever with an arm 267 which is carried by the conveyor clutch shifter 215. By means of this connection, the element 213 of the conveyor clutch is moved to either of its positions or to neutral. The lower end of the operating clutch lever 262 is connected by means of a link 268 to an arm 269 carried by the shifter 231 of the operating clutch 196, whereby this clutch is operated. The lower arm of the selective clutch lever 263 is connected by means of a link 270 to a lever 271. This lever is pivotally mounted at 272 to a fixed part of the main frame and attached to its outer end is a shifter rod 273. This shifter rod carries the shifter 241 of the selective clutch 238 and it extends rearwardly to a point under the main platform, as shown in Fig. 2, where it is pivotally connected to a downwardly extending rod 274 (Fig. 12), carried by the outer end of the arm 181. The shifter rod 273 is, of course, suitably supported, and its slidable connection with the rod 274 compensates for the vertical movement of the carriage. The selective clutch lever 263 thus operates not only the selective clutch 238, but also the carriage clutch 155 and the locking means for the carriage gears 146. The lower end of the jack clutch lever 264 is connected by means of a link 275 to an arm 276 which is carried by the shifter 259, whereby the elevating shaft 106 may be rotated in either direction.

Figure 16:
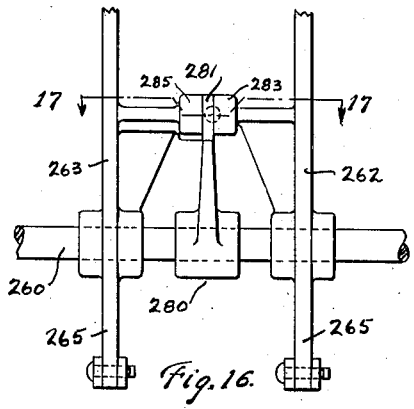
Fig. 16 is an enlarged elevation of the interlocking means for two of the control levers.
Figure 22:
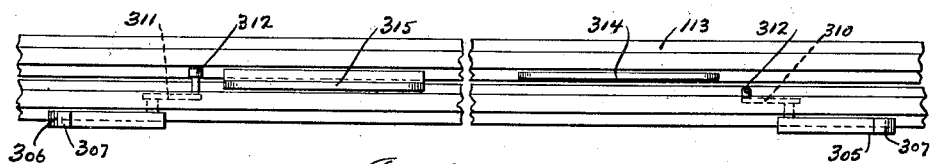
Fig. 22 is a fragmentary, plan view of the car section locking means of our device carried by the platform thereof.
Figure 23:
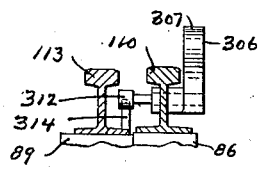
Figs. 23 and 24 are fragmentary, sectional views of the locking means shown in Fig. 22 when the parts thereof are in their co-operative positions.

The selective clutch lever 263 has no neutral position and is always in one or the other of its extreme positions. Since this is a selective lever and determines whether the carriage chains 127 alone shall be operated or whether the carriage 90 itself shall be moved, it is necessary that this lever be positively held in its selected position while the operating clutch lever 262 is being manipulated to operate either the chains or the carriage through the operating clutch 196. Suitable interlocking means are, therefore, provided, as shown enlarged in Figs. 16 and 17. These means comprise an index 280 rigidly mounted upon the lever shaft 260 between the selective clutch lever 263 and the operating clutch lever 262. This index is provided with a plate 281 which has an aperture 282 formed through its central portion. The operating clutch lever 262 is provided with a block 283 which has its face in sliding contact with one face of the plate 281 and which is provided with a centrally arranged recess 284 which registers with the the conveyor will be retained in its position upon the rails 110 of the platform by means of the dogs 305 and 306. When, however, the carriage is moved, for instance, to the right, as shown in Figs. 4 and 22, the cams 315 will engage with the roller 312 of the dogs 305 at the right hand side of the platform or the side from which the section is to be rolled, and will raise the operating arms as cams 315 will serve to depress the hooked end 307 of the dogs 305, thus disengaging the hook at each side of the platform from the blocks which will allow the car section to be run off the conveyor after the carriage has reached its fully extended position and has been locked in this position.

Figure 25:
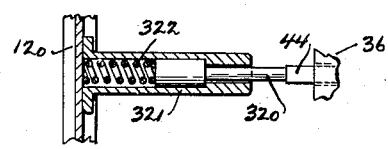
Fig. 25 is a fragmentary, sectional plan view of the car section unlatching means, carried by the carriage of our device.
Figure 24:
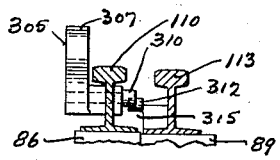

Arranged at each end of the carriage is a spring-pressed plunger 320 carried by a cylindrical casing 321 and kept in its normal outward position by means of a helical spring 322 carried by the casing. The casings are preferably secured to the outer of the curved braces 120 at each end of the carriage, and arranged preferably at opposite sides of the channel irons 118 of the carriage (Figs. 3 and 25). These plungers are engageable with the ends 44 of the stops 36 carried by the car platform 46 for releasing the car section when the carriage 90 of our device is run into position for handling the car section.

Description of operation

Figure 17:
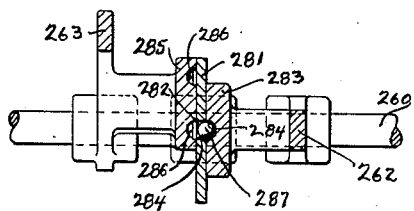
Fig. 17 is a sectional plan view of the same, taken on line 17—17 of Fig. 16.

When our device is to be used, the motive power is put into operation, and the operator takes his place upon the operator's platform 54. The control clutch lever 261 is now operated to move the clutch element 213 either to the right or to the left depending upon the direction in which it is desired to move the conveyor. When the clutch is in either of the directions, the accelerator pedal 290 may be used to govern the speed of travel of the conveyor. When the conveyor is opposite a freight car from which it is desired to remove a car section, the conveyor is stopped by operating the conveyor clutch lever 261 to bring the control clutch 195 to its neutral position. Since it is now necessary to move the carriage 90 out toward and in contact with the platform of the car, the selective clutch lever 263 is now moved toward the operator or in a direction opposite to that shown in Fig. 8, which will actuate the selective clutch 238 and bring its element 239 in engagement with the carriage gear 237, thus connecting this gear to the operating jack shaft 235. When the selective clutch lever 263 is moved toward the operator as just described, the shifter rod 273 will also be drawn toward the operator and through the rod 274 and arm 181 which carries it, the shaft 170 will be operated so as to cause the discs 163 of the carriage locking means to be withdrawn from engagement with the drums 161, carried by the carriage gears 146, thus freeing these gears from locking engagement with the bearings 137. Immediately after, the carriage clutch 155 will be moved to the right as viewed in Fig. 11 and cause the gear 154 to be connected through the medium of idler 153 with the gear 152 mounted upon the carriage shaft 132. This will permit the carriage jack shaft 148 to be rotated, and through the medium of the pinions 147 to operate the carriage gears 146. When the operation of the carriage has thus been determined, the operating clutch lever 262 is moved either backwardly or forwardly depending upon the direction in which the carriage is to be moved. When this lever is moved from its neutral position, the ball 287 of the interlocking means will fall into one of the recesses 286 and thus lock the selective clutch lever 263 in its set position, thereby preventing a change of this position before the operating clutch has been moved to neutral position. When the operating clutch is moved in either direction by the lever 262, either of the bevel gears 228 or 229 will be coupled to the rotating clutch shaft 186, and cause the operating shaft 233 to be rotated in the direction determined by the movement of the operating clutch. Power will be transmitted from this operating shaft through gear 244, idler 243, to the carriage gear 237 carried on the operating jack shaft, it being remembered that this is the gear which was selected by the selective clutch lever. This will cause the operating jack shaft 235 to be rotated at relatively high speed, which through the medium of the chains 250 and 252 and sprockets 245, 249, 251 and 138 cause the rotation of the carriage shaft 132. Since the carriage jack shaft 148 has been previously connected by the carriage clutch 155 to the carriage shaft 132 the carriage drive gears 146 will be rotated, and since they mesh with gear racks 145 carried by the channels 118 of the carriage, the carriage will be moved outwardly from the conveyor. The speed of such movement will be governed automatically by the governor 191 of the intermediate or idler gear 188, connecting the motor gear 181 with the driven gear 189 mounted on the clutch shaft 186. Since all of the clutches of our device are preferably frictional clutches, the end of the carriage may be gradually brought up to its registering position on the flat car. Should it be found that the carriage is not at the proper elevation to meet the platform of the car, the jack clutch 197 will be operated by a manipulation of the jack clutch lever 264. This will cause the rotation of the elevating shaft 106 in a direction to produce the desired results, and, through the medium of the jacks 96, cause the main platform 85 to be elevated or lowered, the desired amount. It may be necessary to operate the conveyor aperture 282 of the plate when the lever 262 is in its neutral position. The selective clutch lever 263 is likewise provided with a block 285 which is in sliding contact with the opposite face of the plate 281. This block is provided with two recesses 286 so positioned that one of the recesses will come opposite the apertures 282 in the plate in one position of the selective clutch lever, and the other recess will come opposite the aperture when this lever is in its other position. A ball 287 is mounted in the aperture 282 of the plate and the diameter of this ball is considerably greater than the thickness of the plate 281 so that a part of its surface must project beyond one face of the plate if the lever block on either side is to have movement with the index. The recesses formed in the blocks are of only sufficient depth to permit the ball to enter either of them a distance which will allow the ball to move to a point where it will clear the opposite side of the index plate. It will thus be seen that, as shown in Fig. 17, the selective clutch lever 263 is in one of its extreme positions, in which position the ball will engage with one of the recesses 286 of the block, thus locking this lever and releasing the operating clutch lever 262. The selective clutch lever 263 when thus locked can not be moved while the operating clutch lever 262 is in any other position but a neutral position, to which position it must be moved before the selective clutch 263 can be operated.

Figure 18:
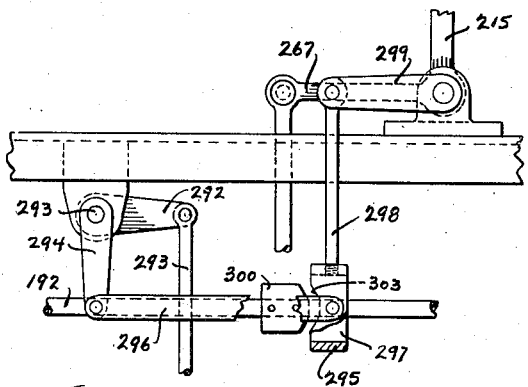
Fig. 18 is a plan view of the accelerator interlocking means.

An accelerator 290 (Fig. 8) is provided for operating the conveyor back and forth across the rails 29. Since the movement of the chains and the movement of the carriage, as well as the movement of the main platform is controlled by the governor 191, some means must be provided for preventing the use of the accelerator on any other application of power than the movement of the complete conveyor. In Figs. 18, 19 and 20, I show a means for accomplishing this. The accelerator comprises a pedal 291 which is suitably pivoted to the platform 54 and is connected to a lever 292 by means of a link 293. The lever 292 is attached to a shaft 293 which is pivotally carried by the frame and to which are attached two horizontally extending levers 294. These levers straddle the accelerator rod 192, and one of them is connected to each side of a slotted block 295 by means of links 296. The block 295 is provided with an elongated slot 297 through which the accelerator rod 192 passes. The block is carried by a link 298 which is pivotally attached to an arm 299 which is carried by the shifter 215 of the conveyor clutch so that it is moved in unison with the arms 267 of the shifter. Attached to the accelerator rod 192 and mounted between the links 296 is a dog 300. The dog is arranged in spaced relation with the slotted block 295 and it has a centrally arranged flat surface 301 with an inclined surface 302 at each side thereof. The coacting edges of the slotted block 295 are provided with recesses 303 which are formed to engage with the flat surface 301 and the inclined surfaces 302 of the dog. When the parts are in the position shown in Fig. 18, the conveyor clutch 195 is in its neutral position, and when in this position the recess 303 of the slotted block will be opposite and in registering position with the surfaces of the dog 300 with a space between them so that if the accelerator is accidentally operated at this time, the slotted block which is actuated by the accelerator will merely move toward the dog 300, but since the space between the block and the dog is substantially the same as the maximum movement of the accelerator pedal, the block will not contact with the dog to move the accelerator rod 192. However, when the conveyor clutch 195 is operated, the slotted block 295 will be moved to either the full line position or the dotted line position, shown in Fig. 20, in either of which positions the recess 303 formed in the edges of the block will be moved away from the dog, and the flat surface 301 thereof will be opposite the edges of the block with substantially no space between these adjacent surfaces. When the accelerator pedal 291 is now depressed, the slotted block 295 will immediately contact with the dog 300 and will thus move the dog with its attached accelerator rod 192 to actuate the throttle of the engine.

After a car section has been drawn upon the carriage and moved over upon the main platform, it is held in a central position upon such platform by means of a dog 305 at one end of each of the rails 110 and a dog 306 at the opposite end of each of the same rails (Figs. 4, 7, 22, 23, and 24). Each of these dogs is provided with a hooked end 307 and each of them is pivotally attached to the rail 110. The hooked end 307 of these dogs is engageable with one of the notches 308 formed on the bearing block 309 of the car section (Fig. 4). Attached to the dog 305 is an operating arm 310, and attached to the dog 306 is an operating arm 311. These operating arms are preferably on the opposite sides of the rails, and each of them carries a roller 312. Each rail 113 of the carriage is provided with a cam 314 which engages with the roller 312 of the operating arm 311, and also with a cam 315 which engages with the roller 312 of the operating arm 310. Each of the dogs is provided with a spring 316 (Figs. 4 and 7) which keeps each dog normally in its elevated position and in the path of the block 309. When the carriage 90 has been moved to the center of the main platform, the cams will be out of engagement with the rollers of the operating arms, in which position the car section upon slightly in either direction so as to bring the rails 113 of the carriage between the rails 35 on the car platform. When these rails are in proper position, the carriage is moved outwardly as above described, so that these rails rest upon the carriage platform, at which time the operating clutch lever 262 is thrown to its neutral position. After the carriage has been moved, as above described, it is necessary that it be locked in position while the car section is being drawn off of the car platform and onto the conveyor. This is done by the movement of the selective clutch lever 263 in the opposite direction or as shown in Fig. 8 of the drawings. When moved to this position the opposite recess 286 of the block 285 will be opposite the ball 287 of the index means and permit the operating clutch lever 262 to be operated when desired. When the selective clutch lever 263 is moved to the position just indicated, it will move the shifter rod 273 away from the operator, which will cause the member 239 of the selective clutch 238 to be moved so as to engage the chain gear 236 with the operating jack shaft. The shifter rod 273 will also cause the shaft 170 to be oscillated so as to operate the carriage clutch 155 to the left as shown in Fig. 11 and cause its tapered member 156 to be engaged with the surface of the tapered recess 157 of the bearing 151 and thus frictionally hold the carriage jack shaft 148 against rotation. Immediately after this operation of the carriage clutch, the discs 163 of the carriage locking means will be thrown into engagement with the drums 161 of the carriage gears 146 and thus lock these gears against rotation. Obviously, when the carriage clutch is operated in the direction indicated, it will disconnect this jack shaft from the gear 154, which will rotate idly upon it. When the carriage is moved, as above described, to its final position, the spring-pressed plunger 320 will engage the outwardly projecting end 44 of the arc-shaped arm 43 of the stop block 36 and force the outer end of the latch 39 carried by the car section out of engagement with the stop block, thus releasing the car section and permitting it to be drawn off of the car platform.

When the parts have been set as just above described, the operating clutch lever 262 is again operated in a direction to produce the desired movement of the chains, and it will be assumed that the upper pass of the chains is being moved in a right hand direction as viewed in Fig. 7. When one of the blocks 128 carried by the chains engages with the lug 129 carried by a car section, the car section will be drawn off of the rails 35 of the car platform and onto the rails 113 of the carriage. The car section will be continuously moved by the chains until it is passed off of the rails 113 of the carriage and onto the rails 110 of the main platform. The rails 110 are slightly higher than the rails 113, so that the car section will be supported by the rails 110 when it is moved onto the conveyor, thus allowing the carriage to be freely moved to its neutral position and then in either direction depending upon what disposition is to be made of the car section. After the car section is moved to the center of the main platform, the hooks 307 of the dogs 305 and 306 will engage with the recesses 308 of the bearing blocks 309, and hold the section in position upon the conveyor.

The chains are, of course, stopped when the car section has reached its central position upon the main platform, and the carriage is now drawn to its neutral position upon the conveyor by means hereinbefore described, whereupon the conveyor is ready to be moved up or down the rails 29 to the desired position, as for instance the lower rails 34 of a warehouse platform, as shown in Fig. 1. When a point opposite the rails is reached, the parts are operated as above described so as to register the rails of the carriage with the rails of the warehouse platform. When so registered, the carriage is moved outwardly and as it is moved, either of the cams 314 or 315 carried by each of the rails 113 will engage with the rollers 312 of either the dogs 305 or 306 to release the car section so that it may be moved by the carriage chains after the carriage has been moved to and locked in its new position.

Obviously, some modifications of the details herein shown and described may be made without departing from the spirit of our invention or the scope of the appended claims, and we do not, therefore, wish to be limited to the exact embodiment herein shown and described, the form shown being merely a preferred embodiment thereof.

Having thus described our invention, what we claim is:

1. The combination with a freight car adapted to carry car sections of a conveyor mounted upon rails parallel to the freight car rails and comprising a main frame movable upon the rails, a carriage slidable laterally across the main frame for bridging the space between the conveyor and the car platform, conveyor chains mounted on the carriage for drawing a car section off of the car platform and onto the conveyor, and means for locking the carriage in its adjusted position while the chains are being operated.

2. The combination with a freight car adapted to carry car sections of a conveyor mounted upon rails parallel to the freight car rails and comprising a main frame movable upon the rails, a carriage slidable laterally across the main frame for bridging the space between the conveyor and the car platform, conveyor chains mounted on the carriage, means for operating the carriage, and means for operating the conveyor chains, the relative speed of operation of the carriage and conveyor chains being such that the upper pass of the conveyor chains will remain stationary while the carriage is being operated.

3. The combination with a freight car adapted to carry car sections of a conveyor mounted upon rails parallel to the freight car rails and comprising a main frame movable upon the rails, a main platform carried by the main frame, a carriage slidable laterally across the platform for bridging the space between the conveyor and the car platform, conveyor chains mounted on the carriage, means for operating the carriage, and means for operating the conveyor chains, the relative speed of operation of the carriage and conveyor chain being such that the upper pass of the conveyor chains will remain stationary while the carriage is being operated.

4. The combination with a freight car adapted to carry car sections of a conveyor mounted upon rails parallel to the freight car rails and comprising a main frame movable upon the rails, a main platform carried by the main frame, means for changing the elevation of the main platform, a carriage slidably suported by the main platform and movable across the space formed between the car platform and the conveyor, locking means carried by the main platform for locking a car section in position, and means mounted on the carriage for releasing said locking means when the carriage is moved outwardly.

5. The combination with a freight car adapted to carry car sections of a conveyor mounted upon rails parallel to the freight car rails and comprising a main frame movable upon the rails, a main platform carried by the main frame, a carriage slidably mounted on the main platform and movable toward the freight car to bridge the space between it and the conveyor, conveyor chains mounted upon the carriage and provided with means for engaging the car section to draw it onto the conveyor, a carriage shaft carried by the main platform and having sprockets engageable with the conveyor chains for driving them, and clutch controlled means for operating the carriage shaft.

6. The combination with a freight car adapted to carry car sections of a conveyor mounted upon rails parallel to the freight car rails and comprising a main frame movable upon the rails, a main platform carried by the main frame, a carriage slidably mounted on the main platform and movable toward the freight car to bridge the space between it and the conveyor, conveyor chains mounted upon the carriage and provided with means for engaging the car section to draw it onto the conveyor, a carriage shaft carried by the main platform and having sprockets engageable with the conveyor chains for driving them, gear racks carried by the carriage, carriage drive gears rotatably mounted upon the carriage shaft and engageable with the racks, clutch controlled means for operating the carriage shaft, and clutch controlled means for operating the carriage drive gears.

7. The combination with a freight car adapted to carry car sections of a conveyor mounted upon rails parallel to the freight car rails and comprising a main frame movable upon the rails, a main platform carried by the main frame, a carriage slidably mounted on the main platform and movable toward the freight car to bridge the space between it and the conveyor, conveyor chains mounted upon the carriage and provided with means for engaging the car section to draw it onto the conveyor, a carriage shaft carried by the main platform and having sprockets engageable with the conveyor chains for driving them, gear racks carried by the carriage, carriage drive gears rotatably mounted upon the carriage shaft and engageable with the racks, clutch controlled means for operating the conveyor chains, clutch controlled means for operating the carriage drive gears, and locking means for locking the carriage drive gears while the conveyor chains are being operated.

8. The combination with a freight car adapted to carry car sections of a conveyor mounted upon rails parallel to the freight car rails and comprising a main frame movable upon the rails, a main platform carried by the main frame, a carriage slidably mounted on the main platform and movable toward the freight car to bridge the space between it and the conveyor, conveyor chains mounted upon the carriage and provided with means for engaging the car section to draw it onto the conveyor, a carriage shaft carried by the main platform and having sprockets engageable with the conveyor chains for driving them, gear racks carried by the carriage, carriage drive gears rotatably mounted upon the carriage shaft and engageable with the racks, a carriage jack shaft having pinions engageable with the carriage drive gears, gears connecting the carriage shaft with the carriage jack shaft, clutch means for connecting the carriage shaft with the carriage jack shaft and for applying a brake to the carriage jack shaft clutch controlled means for driving the carriage shaft, and locking means for the carriage drive gears for locking them against rotation when the brake is applied to the carriage jack shaft.

9. The combination with a freight car adapted to carry car sections of a conveyor mounted upon rails parallel to the freight car rails and comprising a main frame movable upon the rails, a main platform carried by the main frame, a carriage slidably mounted on the main platform and movable toward the freight car to bridge the space between it and the conveyor, conveyor chains mounted upon the carriage and provided with means for engaging the car section to draw it onto the conveyor, a carriage shaft carried by the main platform and havings sprockets engageable with the conveyor chains for driving them, rack and gear means for operating the carriage, an operating jack shaft carried by the main frame and connected to the carriage shaft, an operating shaft adjacent the operating jack shaft, a chain gear rotatably mounted upon the operting jack shaft, a carriage gear rotatably mounted upon the operating jack shaft, clutch means mounted on the operating jack shaft for connecting either the chain gear or carriage gear therewith, means for locking the rack and gear means of the carriage when the chain gear is coupled with the operating jack shaft, and means for operating the rack and gear means when the carriage gear is coupled with the operating jack shaft, and clutch control means for rotating the operating shaft.

10. The combination with a freight car adapted to carry car sections of a conveyor mounted upon rails parallel to the freight car rails and comprising a main frame movable upon the rails, a carriage slidable laterally across the main frame for bridging the space between the conveyor and the car platform, conveyor chains mounted on the carriage, motive power means carried by the main frame, a clutch shaft carried by the main frame and connected to the motive power, a conveyor clutch carried by the clutch shaft, and means controlled thereby for connecting the clutch shaft with the axle of the main frame for propelling the conveyor in either direction, an operating clutch carried by the clutch shaft, means connecting this clutch with the carriage for operating the same, or with the conveyor chains, and a selective clutch carried by the frame for determining whether the carriage or the conveyor chains shall be operated.

11. The combination with a freight car adapted to carry car sections of a conveyor mounted upon rails parallel to the freight car rails and comprising a main frame movable upon the rails, a carriage slidable laterally across the main frame for bridging the space between the conveyor and the car platform, conveyor chains mounted on the carriage, motive power means carried by the main frame, a clutch shaft carried by the main frame and connected to the motive power, a conveyor clutch carried by the clutch shaft, means controlled thereby for connecting the clutch shaft with the axle of the main frame for propelling the conveyor in either direction, an operating clutch carried by the clutch shaft, means connecting this clutch with the carriage and with the conveyor chains for operating the same, a selective clutch carried by the frame for determining whether the carriage or the conveyor chains shall be operated, and means for locking the carriage when the conveyor chains are being operated.

12. The combination with a freight car adapted to carry car sections of a conveyor mounted upon rails parallel to the freight car rails and comprising a main frame movable upon the rails, a carriage slidable laterally across the main frame for bridging the space between the conveyor and the car platform, conveyor chains mounted on the carriage, motive power means carried by the main frame, a clutch shaft carried by the main frame and connected to the motive power, a conveyor clutch carried by the clutch shaft, and means controlled thereby for connecting the clutch shaft with the axle of the main frame for propelling the conveyor in either direction, an operating clutch carried by the clutch shaft, means connecting this clutch with the carriage and with the conveyor chains for operating the same, a selective clutch carried by the frame for determining whether the carriage or the conveyor chains shall be operated, and means for interlocking the operating clutch and the selective clutch, whereby the selective clutch may be operated only when the operating clutch is in its neutral position.

13. A freight handling device comprising a freight car provided with laterally arranged means for supporting car sections, a conveyor arranged adjacent to the freight car rails, and comprising a main frame movable upon the rails, a main platform carried by the main frame, jacks carried by the main frame for elevating the main platform, a carriage mounted on the main platform for bridging the space between the car platform and the conveyor, motive power means carried by the main frame, a clutch shaft carried by the main frame and connected to the motive power, a jack clutch mounted upon clutch shaft, an elevating shaft carried by the main frame and connected to the jack clutch, and means connecting the elevating shaft with the jacks.

14. The combination with a freight car adapted to carry car sections of a conveyor mounted upon rails parallel to the freight car rails and comprising a main frame movable upon the rails, a main platform carried by the main frame, means for changing the elevation of the main platform, a carriage slidably supported by the main platform and movable across the space formed between the car platform and the conveyor, a rail mounted at each side of the carriage, and a rail mounted at each side of the platform, the rails mounted upon the platform being in parallel relation with the rails of the carriage and slightly higher than the carriage rails.

15. The combination with a freight car adapted to carry car sections of a conveyor mounted upon rails parallel to the freight car rails and comprising a main frame movable upon the rails, a carriage slidable laterally across the main frame for bridging the space between the conveyor and the car platform, conveyor chains mounted on the carriage, motive power means carried by the main frame, a clutch shaft carried by the main frame and connected to the motive power, a reciprocating accelerator rod connected to the motive power, a conveyor clutch carried by the clutch shaft and having a shifter arm, means connecting the clutch shaft with the axle of the main frame for propelling the conveyor, a slotted block controlled by the shifter rod and disposed around the accelerator rod, a dog carried by the rod, and an accelerator control for operating the block, the block and the dog having co-acting surfaces so formed that the accelerator rod will be actuated by the accelerator control only when the shifter arm of the clutch is moved to either of its operative positions.

16. The combination with a freight car adapted to carry car sections of a conveyor mounted upon rails parallel to the freight car rails and comprising a main frame movable upon the rails, a carriage mounted upon the main frame for bridging the space between the conveyor and the car platform, conveyor chains mounted on the carriage for drawing a car section off of the car platform and onto the conveyor, and means for locking the carriage in its adjusted position while the chains are being operated.

17. The combination with a freight car adapted to carry car sections of a conveyor mounted upon rails parallel to the freight car rails and comprising a main frame movable upon the rails, a main platform carried by the main frame, a carriage slidably supported by the main platform and movable across the space formed between the car platform and the conveyor, locking means carried by the main platform for locking a car section in position, and means mounted on the carriage for releasing said locking means when the carriage is moved outwardly.

18. The combination with a freight car adapted to carry car sections of a conveyor mounted upon rails parallel to the freight car rails and comprising a main frame movable upon the rails, a main platform carried by the main frame, a carriage supported by the main platform and movable across the space formed between the car platform and the conveyor, locking means carried by the main platform for locking a car section in position, and means mounted on the carriage for releasing said locking means when the carriage is moved outwardly.

19. The combination with a freight car adapted to carry car sections of a conveyor mounted upon rails parallel to the freight car rails and comprising a main frame movable upon the rails, a main platform carried by the main frame, a carriage mounted upon the main platform and movable toward the freight car to bridge the space between it and the conveyor, conveyor chains mounted upon the carriage and provided with means for engaging the car section to draw it onto the conveyor, a carriage shaft carried by the main platform and have sprockets engageable with the conveyor chains for driving them, and clutch controlled means for operating the carriage shaft.

20. The combination with a freight car having tracks adapted to carry car sections of a conveyor mounted upon rails parallel to the freight car rails and comprising a main frame movable upon the rails, a main platform carried by the main frame, means for changing the elevation of the main platform, a carriage slidably mounted upon the main platform for bridging the space formed between the car platform and the conveyor, a track carried by the main platform, a track carried by the carriage, the track of the carriage being parallel with the tracks of the main and car platforms and in telescopic arrangement therewith, the carriage track being slightly below the main platform track.

21. The combination with a freight car adapted to carry car sections of a conveyor mounted upon rails parallel to the freight car rails and comprising a main frame movable upon the rails, a main platform carried by the main frame, a carriage slidably supported by the main platform and movable across the space formed between the car platform and the conveyor, a track carried by the main platform, a track carried by the carriage, the track of the carriage being arranged in parallel relation with the track of the platform and in telescopic arrangement therewith, locking means for locking a car section in position upon the main platform, comprising locking dogs carried at the ends of the main platform track, cams mounted upon the carriage for engagement with the dogs of the platform track when the carriage is moved to either of its extended positions.

22. A freight handling device comprising a freight car provided with laterally arranged means for supporting car sections, a conveyor arranged adjacent to the freight car rails and comprising a vertically movable main frame, a carriage slidable laterally across the main frame for bridging the space between the conveyor and the car platform, conveyor chains mounted on the carriage for drawing a car off of the car platform and onto the conveyor, and means for locking the carriage in its adjusted position while the chains are being operated.

In testimony whereof, we have hereunto signed our names.

WILLIAM E. LEECH.
WOODWARD T. LEECH.
ALFRED T. BARAGER.